March 8, 1949.　　　R. C. OLESEN　　　2,463,553
INTEGRATING SYSTEM
Filed April 5, 1944
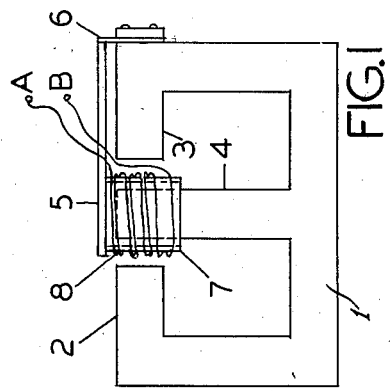
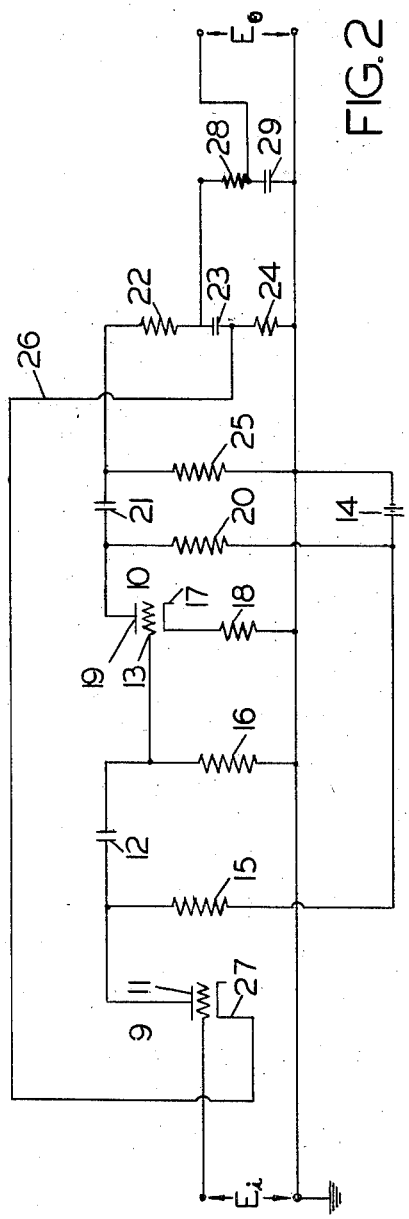
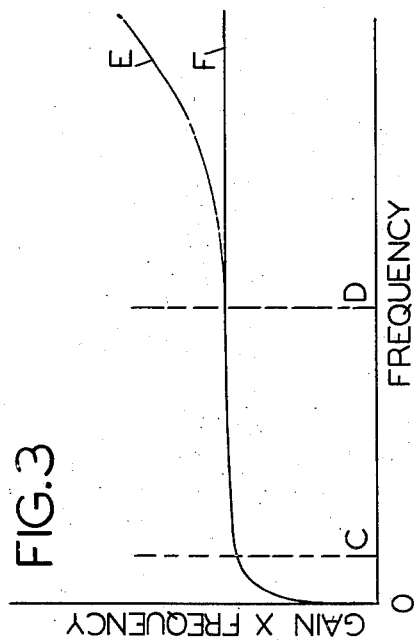
INVENTOR
Raymond C. Olesen
BY
Christie & Angus
ATTORNEYS Patented Mar. 8, 1949

2,463,553

UNITED STATES PATENT OFFICE 2,463,553

INTEGRATING SYSTEM

Raymond C. Olesen, Altadena, Calif., assignor to Consolidated Engineering Corporation, Pasadena, Calif., a corporation of California Application April 5, 1944, Serial No. 529,886

7 Claims. (Cl. 250—27)

This invention relates to wave transmission and particularly to systems for translating non-electrical wave energy into electrical wave energy.

The principal object of the invention is to derive a substantial electrical voltage proportional to the amplitude of a received non-electrical wave.

It is a common practice to pick up waves of a non-electrical nature such as sound or seismic waves by a pickup device which converts them to electric waves. A common type of pickup, for example, is the electro-magnetic pickup comprising an element which vibrates in unison with the received wave and produces at its output a corresponding voltage. Such pickups are commonly used in seismic prospecting work.

A characteristic of most pickups is that their output voltage is proportional to the velocity of the received waves. It is usually desired, however, to have an output voltage which is proportional to the amplitude of the received waves, rather than to their velocity.

Networks have heretofore been designed which are capable of translating a voltage proportional to wave velocity to a voltage proportional to wave amplitude. Such networks have heretofore had the disadvantage that their output voltage is undesirably small and also that the proportionality to amplitude is had over only a limited range of frequency.

In accordance with my invention I provide a system for obtaining from a voltage proportional to wave velocity a relatively high voltage which is proportional to wave amplitude over a wide range of frequency. I effectuate this by the use of a network of resistors and capacitors with an amplifier having an inverse feedback connection from the network to a preceding portion of the amplifier.

A feature of my invention resides in a circuit arrangement in which one terminal of the voltage which is made proportional to the wave velocity is grounded, thereby facilitating its further amplification.

The invention will be better understood from the following detailed description and the accompanying drawing of which:

Fig. 1 shows an electro-magnetic type of pickup device useful with the system of my invention;

Fig. 2 illustrates a system embodying my invention; and

Fig. 3 is a graph showing the performance of the system of my invention.

The electro-magnetic pickup shown in Fig. 1 is a type useful for receiving seismic waves. It comprises a base 1 constituting part of an electromagnet having pole pieces 2 and 3 and a central pole member 4. A coil support 5 of substantial inertia is held above the pole member 4 by a member 6 through which vibration is not appreciably transmitted. It carries a cylindrical coil form 7 having on it a coil 8. Seismic vibration transmitted through the base 1 vibrates the pole member 4 longitudinally within coil 7 and induces a voltage in the coil. As the induced voltage is proportional to the rate of change of flux through it, the output voltage at terminals A—B is proportional to the velocity of the received seismic wave.

To convert such an output to a wave form proportional to the amplitude of the seismic or other waves which have been picked up I use a network of which an example is shown in Fig. 2. It comprises an amplifier of which there are shown two stages 9 and 10, although it will be understood that more or less stages could be used if desired. Each stage comprises a vacuum tube having a cathode, a grid and an anode. The anode 11 in stage 9 is coupled through a coupling condenser 12 to grid 13 of the second stage 10. Plate current for anode 11 is supplied from a voltage source 14 through a resistor 15. A grid leak 16 is provided for grid 13 in a conventional manner. This is connected with cathode 17 of stage 10 through a resistor 18, which supplies self bias for the tube 10. It will be understood that resistor 18 may be by-passed by a condenser, if desired; or on the other hand, resistor 18 may even be omitted and bias supplied by a battery in series with resistor 16. Plate current for anode 19 is supplied through a resistor 20 from the voltage source 14. The output circuit of stage 10 comprises between the anode 19 and ground, in the order named, a coupling condenser 21 and the series arrangement of resistor 22, condenser 23, and resistor 24. A suitable resistor 25 is connected between ground and the side of blocking condenser 21 which is remote from anode 19. The resistor 25 serves as a grid leak for the stage which may be connected with the output of stage 10. The amplifier is provided with an inverse feedback connection 26 from a point between condenser 23 and resistor 24 back to the cathode 27 of tube 9. There is connected across the elements 23 and 24 a resistor 28 and a condenser 29, the condenser being connected at the ground side of the resistor 28.

The amplifier acting in conjunction with the condenser 23 in its output circuit operates to integrate the current through condenser 23. The gain A of such an arrangement is given by the expression:

$$A = \frac{\mu}{1+\mu B}$$
$$= \frac{1}{B}$$

when B is large. In these expressions B is the proportion of the entire output voltage $E_0$ which is fed back 180° out of phase by the feedback connection.

For proper integration of the current it is necessary that constant current through the condenser 23 should be had at all frequencies within the range of the integration, that is, the product of the voltage across the condenser and the frequency must be constant throughout the frequency range. This relationship is obtained by the inverse feedback circuit. That this is so can be observed from the following mathematical analysis of the system, (assuming elements 28 and 29 to be absent):

Let
$$Z = R_{22} - \frac{j}{2\pi f C_{23}}$$

$\mu$ = Voltage gain of amplifier without inverse feedback.

$A = \frac{E_0}{E_i}$ = Voltage gain of amplifier with inverse feedback.

B = Fraction of output voltage fed back to input.
$R_{22}$ = Resistance of resistor 22.
$C_{23}$ = Capacity of capacitor 23.
$R_{24}$ = Resistance of resistor 24.
$I_0$ = Current through the feedback connections, 22, 23.

Then: In any case, $$B = \frac{R_{24}}{R_{24}+Z} \quad (1)$$

When Z is large compared to $R_{24}$, $$B = \frac{R_{24}}{Z} \quad (2)$$

In any case, $$A = \frac{\mu}{1+\mu B} \quad (3)$$

When $\mu B$ is large compared to unity, $$A = \frac{1}{B} \quad (4)$$

Substituting Equation 2 in Equation 4, $$A = \frac{Z}{R_{24}} \quad (5)$$

Therefore, $$\frac{Z}{R_{24}} = \frac{E_0}{E_i} \quad (6)$$

and, $$E_0 = \frac{E_i Z}{R_{24}} \quad (7)$$

In any case, $$I_0 = \frac{E_0}{R_{24}+Z} \quad (8)$$

When Z is large compared to $R_{24}$, $$I_0 = \frac{E_0}{Z} \quad (9)$$

Substituting Equation 7 in Equation 9, $$I_0 = \frac{E_i Z}{R_{24} Z} = \frac{E_i}{R_{24}} \quad (10)$$

Thus $I_0$ is substantially independent of Z as long as $\mu B$ is large compared to unity and Z is large compared to $R_{24}$. As long as these conditions are met, the current through condenser $C_{23}$ is independent of frequency and the voltage across condenser $C_{23}$ is a time integral of the input voltage, $E_i$.

This relationship for integration holds for the voltage between ground and the junction of resistor 22 and condenser 23 in the feedback system for a limited range of frequency, as shown by the graph in Fig. 3. Thus, the integration at condenser 23 is had between regions C and D. Above region D, however, true integration is not obtained (in the absence of additional elements 28 and 29) as the product of gain and frequency increases as shown by the portion E of the curve. This is due to the fact that at high frequencies the reactance of condenser 23 is not large compared to the resistance of resistor 24.

The voltage across condenser 23 is proportional to the amplitude of the picked-up wave over the range between C and F. It is difficult to utilize this integrated voltage though because neither side of the condenser is at ground potential. Thus a succeeding amplifier stage cannot readily utilize the voltage across the condenser because good amplifier operation would ordinarily require one side of the succeeding amplifier to be grounded.

The resistor 28 and condenser 29 when used in conjunction with condenser 23 and resistor 24 as shown, however, do result in integration over the entire frequency range, as shown by line F in Fig. 3, such that the output voltage $E_0$ is proportional to the amplitude of the waves received by the pickup, when the following relationship is had:

$$R_{24} C_{23} = R_{28} C_{29}$$

where
$R_{24}$ is the resistance of resistor 24,
$C_{23}$ is the capacity of capacitor 23,
$R_{28}$ is the resistance of resistor 28
$C_{29}$ is the capacity of capacitor 29

Since one side of condenser 29 is grounded, this can readily be connected to the ground side of a succeeding amplifier and the output voltage $E_0$ can thus readily be utilized.

Values which have been found suitable for the impedance elements are:

$R_{22}$ = 10,000 ohms
$C_{23}$ = 0.05 mf.
$R_{24}$ = 10,000 ohms
$R_{28}$ = 100,000 ohms
$C_{29}$ = 0.005 mf.

It will be understood, however, that the invention is not limited to these values, which are given merely for illustration.

I claim:
1. An integrating system comprising an amplifier having a condenser and a resistor in series in its output circuit, the side of said resistor remote from said condenser being at ground potential, and another resistor and condenser arranged in series and connected across the first mentioned condenser and resistor such that the second mentioned condenser is at ground potential and the product of the capacity of the first mentioned condenser and resistance of the first mentioned resistor and the product of the capacity of the second mentioned condenser and the resistance of the second mentioned resistor approximate equality, and an inverse feed back connection from the point between the first mentioned con- denser and the first mentioned resistor to a preceding point of the amplifier.

2. A system according to claim 1, in which the product of the first mentioned resistor and condenser is equal to the product of the second mentioned resistor and condenser.

3. An integrating system comprising an amplifier, a network comprising a first condenser, a first resistor, a second condenser and a second resistor serially arranged in the order named in a closed circuit and having values such that the product of the capacity of said first condenser and the resistance of said first resistor is equal to the product of the capacity of said second condenser and the resistance of said second resistor, the first condenser and first resistor being included in the output circuit of said amplifier in the order named, and an inverse feedback connection from the point between the first condenser and first resistor to the cathode of a preceding tube of the amplifier.

4. A system for converting an electrical wave which is proportional to the velocity of a received wave to an electrical wave which is proportional to the amplitude of said received wave, over a range of frequency, said system comprising an amplifier, means for impressing the first mentioned electrical wave on the input of said amplifier, a first resistor, a capacitor and a second resistor connected in series in the order named in the output circuit of said amplifier, the resistance of said first resistor being larger than the reactance of said capacitor over said frequency range, a third resistor and a second capacitor arranged in series and connected across the series arranged first capacitor and second resistor so that the second capacitor is connected with said second resistor, the product of the first capacitor and second resistor being substantially equal to the product of the third resistor and second capacitor, and an inverse feedback connection from the point between the first capacitor and second resistor to a preceding tube of said amplifier.

5. A system according to claim 4 in which the feedback connection is connected to the cathode of the stage preceding the output stage.

6. A system for converting an electrical wave which is proportional to the velocity of a received wave to an electrical wave which is proportional to the amplitude of said received wave, over a range of frequency, said system comprising an amplifier having a plurality of stages in tandem, the last of the stages having in its anode circuit a first resistor, a capacitor and a second resistor arranged in series in the order named with the second resistor grounded at its side remote from the capacitor, a feedback connection from the junction between the capacitor and the second resistor to the cathode of the stage next preceding the last stage, and a second capacitor and third resistor arranged in series in the order named from ground to the junction between the first resistor and capacitor, the product of the capacity of the first capacitor and the resistance of the second resistor being substantially equal to the product of the capacity of the second capacitor and the resistance of the third resistor.

7. An integrating system comprising an amplifier having a condenser and a resistor in series in its output circuit in the order named, and another resistor and condenser arranged in series and connected across the series-arranged first-mentioned condenser and first-mentioned resistor such that the terminal of the second-mentioned condenser which is remote from the second-mentioned resistor is connected to the terminal of the first-mentioned resistor which is remote from the first-mentioned condenser, and an inverse feedback connection from the point between the first-mentioned condenser and the first-mentioned resistor to a preceding point of the amplifier.

RAYMOND C. OLESEN.

REFERENCES CITED

The following references are of record in the file of this patent:

UNITED STATES PATENTS

| Number | Name | Date |
| --- | --- | --- |
| 2,099,536 | Scherbatskoy et al. | Nov. 16, 1937 |
| 2,143,398 | White | Jan. 10, 1939 |
| 2,251,973 | Beale et al. | Aug. 12, 1941 |